July 5, 1938.    J. G. HUGHES    2,122,522
ELECTRICAL HEATING DEVICE
Filed Dec. 24, 1934
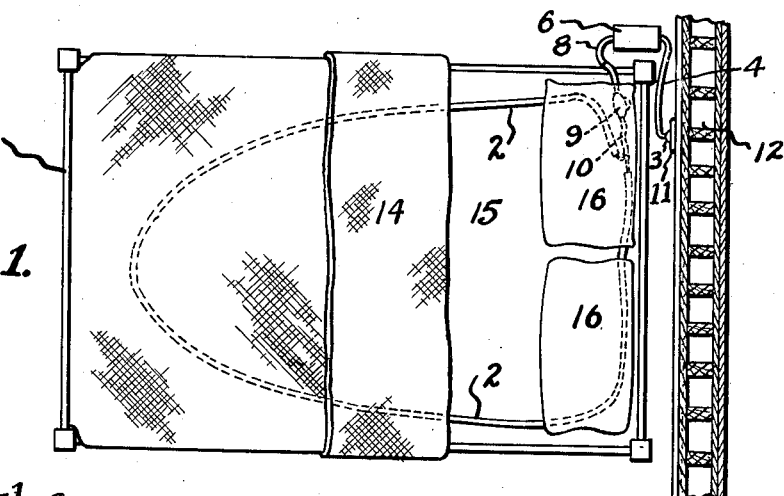
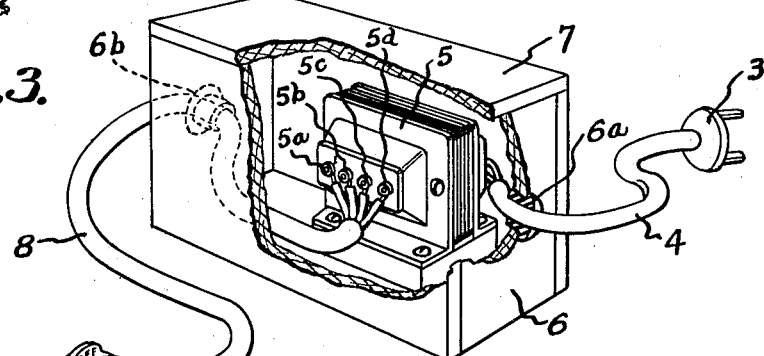
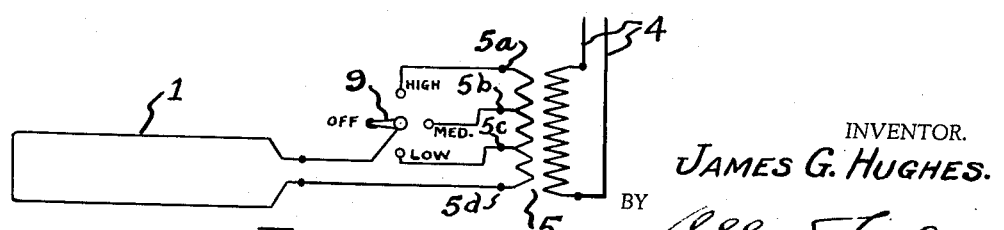
INVENTOR.
JAMES G. HUGHES.
BY
ATTORNEYS.

Patented July 5, 1938

2,122,522

UNITED STATES PATENT OFFICE 2,122,522

ELECTRICAL HEATING DEVICE

James G. Hughes, Cincinnati, Ohio

Application December 24, 1934, Serial No. 758,978

3 Claims. (Cl. 219—46)

My invention relates to electrical heating devices adapted to disseminate heat over a relatively large area by means of a simple compactible heating element. More particularly I contemplate the use of my device as a bed warmer.

Until recent years the electric pad which replaced the hot water bottle has been used almost exclusively for this purpose. The electric heating pad has overcome many of the disadvantages of the hot water bottle, but it shares with the bottle, and with other known devices, a great limitation, in that its heat output is distinctly localized. The area of the average heating device of any of the above-mentioned types, is probably not over one square foot, and therefore, while the bed, or the body may be warm in the immediate vicinity of the device, the rest of the body gets very little heat.

It is an object of my invention, therefore, to provide an electric bed warming device which will not be more expensive to manufacture than the average electrical pad on the market now, and which, when packed, will not be as bulky, but which will, nevertheless, disseminate heat to substantially the whole bed, thus warming the sleeper's entire body.

It is another object of my invention to provide a device of the type described, which will not subject the user to the danger of electric shock, should the body come in contact with bare wire as a result of wear or which will permit drawing of an arc should the resistance wire break.

Further, it is an object of my invention to provide a device having the desirable qualities pointed out hereinabove, which will be operated from regular house current.

These and other objects of my invention which will be set forth hereinafter or will be apparent to one skilled in the art upon reading these specifications, I accomplish by that certain construction and arrangement of parts of which I shall now describe a preferred embodiment. Reference is now made to the drawing which forms a part hereof and in which—

Figure 1 is a plan view of a bed showing how my novel heating device is used.

Figure 2 is a general view of my device in perspective, with parts broken away to show the construction.

Figure 3 is a sectional view on the line 3—3 of Figure 2.

Figure 4 is a wiring diagram for my heater.

Briefly, in the practice of my invention, I provide a heating element 1, which may be made from a single strand of nichrome or other resistant wire, not coiled. The heating element 1 is encased in a suitable cover 2, which is preferably a flat, woven fabric tube and can be removed for cleaning by disconnecting one end of the heating element and slipping it off. The wire should be of sufficient gauge to withstand physical strain for the best construction.

I derive my current from an ordinary wall socket by means of a conventional plug 3. The current is conducted from the plug through an insulating tube 4 to a step-down voltage transformer 5. I prefer to house my transformer in a casing 6 provided with a cover 7, and having two holes, 6a and 6b, to provide entrance for the primary leads and exit for the secondary leads.

I have shown, but without intending to limit myself thereto, a transformer having a secondary with two intermediate taps, 5b and 5c in addition to the two end taps 5a and 5d. I lead the four secondary taps through an insulating tube 8 to a switch 9, which may be of any conventional type. In connection with the transformer illustrated, I prefer a switch capable of two intermediate positions in addition to the on and off positions. Thus, in the embodiment shown, I may selectively utilize none, one-third, two-thirds, or all of the secondary, giving respectively no heat, low, medium and high heat. The two output leads from the switch 9 are led through an insulating tube 10 to the heating element 1. The connections between the switch 9, and the transformer 5, are clearly illustrated in Fig. 4, where similar parts are represented by like reference numerals. Of course resistance coils could be used to accomplish a similar purpose to the transformer.

The transformer in my device serves two purposes: first, by means of the taps, I am enabled to provide for different degrees of heat, and, second, by virtue of the fact that I use a step-down voltage transformer, I may utilize initially an E. M. F. of 110 volts, which is available in almost all homes, and yet operate the heating element at a voltage of, say, 12 volts. This latter feature makes my device safe for use by those afflicted with enuresis, in that, should the cover tube 2 become saturated so as to permit of a short circuit, or worn away at several points, there will be no shock suffered by the user, sufficient to be appreciated or felt. The use of low voltage for heating would prevent any arcing which might cause fire should the resistance wire become broken due to excessive wear or accident. There have been instances in which former electric pads have been known to start a fire by arcing.

In the practice of my invention, I insert the plug 3 in a wall socket 11 provided in a wall 12, place the transformer box 6 on the floor near the head of the bed 13, and place the heating element 1 with its covering 2 between the sheets 14 and 15, and under the pillows 16. It is desirable to arrange the heating element in the manner shown in Fig. 1, so that the body of the user is encircled by it, and so that the control switch 9 is in convenient position.

It is to be understood that different forms of my preferred embodiment may be made without departing from the spirit of my invention, the essentials of which are set forth in the claims that follow.

Having now described my invention, what I claim as new and desire to secure by Letters Patent, is:

1. In an electric bed warming device, a resistance wire heating element covered by a flat, woven fabric casing, said element being formed in a loop of sufficient length to encircle lengthwise a reclining human body.

2. In an electric bed warming device, a nichrome wire heating element covered by a flat, woven fabric casing, said element being formed in a loop of sufficient length to encircle lengthwise a reclining human body, and of such resistance as to provide heat at low voltage.

3. In an electric bed warming device a resistance wire heating element covered by a flat casing, said element being formed in a loop of sufficient length to encircle lengthwise a reclining human body.

JAMES G. HUGHES.